United States Patent
Hwangbo et al.

(10) Patent No.: US 10,229,324 B2
(45) Date of Patent: Mar. 12, 2019

(54) VIDEO SUMMARIZATION USING SEMANTIC INFORMATION

(71) Applicant: INTEL CORPORATION, Santa Clara, CA (US)

(72) Inventors: Myung Hwangbo, Lake Oswego, OR (US); Krishna Kumar Singh, Davis, CA (US); Teahyung Lee, Chandler, AZ (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 14/998,322

(22) Filed: Dec. 24, 2015

(65) Prior Publication Data

US 2017/0185846 A1 Jun. 29, 2017

(51) Int. Cl.
*G06K 9/00* (2006.01)
*G06K 9/46* (2006.01)
*G06K 9/62* (2006.01)

(52) U.S. Cl.
CPC ..... *G06K 9/00751* (2013.01); *G06K 9/00718* (2013.01); *G06K 9/00765* (2013.01); *G06K 9/46* (2013.01); *G06K 9/628* (2013.01)

(58) Field of Classification Search
CPC ........... G06K 9/00536; G06K 9/00744; G06K 9/6284; G06K 9/00718; G06F 17/30843; G06T 7/11; G06T 7/174; G06T 7/215; G06T 7/246
See application file for complete search history.

(56) References Cited

U.S. PATENT DOCUMENTS

| | | | |
|---|---|---|---|
| 7,000,200 B1 | 2/2006 | Martins | |
| 8,089,563 B2 * | 1/2012 | Girgensohn | G06F 17/30811 |
| | | | 348/159 |
| 8,243,203 B2 * | 8/2012 | Suh | G06F 17/30814 |
| | | | 348/700 |
| 9,129,158 B1 * | 9/2015 | Medasani | G06K 9/00335 |
| 2002/0080162 A1 | 6/2002 | Pan et al. | |
| 2004/0125877 A1 * | 7/2004 | Chang | G06F 17/30787 |
| | | | 375/240.28 |
| 2004/0189863 A1 * | 9/2004 | Gu | G06K 9/32 |
| | | | 348/416.1 |
| 2004/0221322 A1 | 11/2004 | Shen et al. | |

(Continued)

OTHER PUBLICATIONS

Chu, W.S., Song, Y., Jaimes, A.: Video co-summarization: video summarization by visual co-occurrence. In: CVPR. IEEE (2015).*

(Continued)

*Primary Examiner* — Bhavesh M Mehta
*Assistant Examiner* — Ian L Lemieux
(74) *Attorney, Agent, or Firm* — International IP Law Group, P.L.L.C.

(57) ABSTRACT

An apparatus for video summarization using semantic information is described herein. The apparatus includes a controller, a scoring mechanism, and a summarizer. The controller is to segment an incoming video stream into a plurality of activity segments, wherein each frame is associated with an activity. The scoring mechanism is to calculate a score for each frame of each activity, wherein the score is based on a plurality of objects in each frame. The summarizer is to summarize the activity segments based on the score for each frame.

22 Claims, 9 Drawing Sheets

(56) References Cited

U.S. PATENT DOCUMENTS

| | | | | |
|---|---|---|---|---|
| 2006/0059120 | A1* | 3/2006 | Xiong | G06F 17/30787 |
| 2009/0041312 | A1* | 2/2009 | Wakasugi | G06K 9/00711 |
| | | | | 382/118 |
| 2009/0089587 | A1 | 4/2009 | Brunk et al. | |
| 2009/0091443 | A1 | 4/2009 | Chen et al. | |
| 2011/0182469 | A1* | 7/2011 | Ji | G06K 9/4628 |
| | | | | 382/103 |
| 2012/0033949 | A1* | 2/2012 | Lu | G11B 27/034 |
| | | | | 386/285 |
| 2013/0195359 | A1* | 8/2013 | Yabu | G06T 7/0083 |
| | | | | 382/171 |
| 2013/0259390 | A1* | 10/2013 | Dunlop | G06K 9/00718 |
| | | | | 382/224 |
| 2014/0161354 | A1* | 6/2014 | Curcio | G06K 9/00718 |
| | | | | 382/190 |
| 2014/0270482 | A1* | 9/2014 | Chakraborty | G06K 9/00221 |
| | | | | 382/154 |
| 2014/0341476 | A1* | 11/2014 | Kulick | G06K 9/6267 |
| | | | | 382/224 |
| 2016/0140395 | A1* | 5/2016 | Kumar | G06K 9/00664 |
| | | | | 382/103 |
| 2016/0350336 | A1 | 12/2016 | Checka et al. | |
| 2017/0017857 | A1* | 1/2017 | Wolf | G06K 9/00335 |
| 2017/0109584 | A1* | 4/2017 | Yao | G06K 9/00718 |

OTHER PUBLICATIONS

Marcus Rohrbach et al. Script Data for Attribute-Based Recognition of Composite Activities. ECCV 2012.*
Ethan Fast et al. Mining Human Behaviors from Fiction to Power Interactive Systems, Proceedings of the 2016 CHI Conference on Human Factors in Computing Systems, May 7-12, 2016.*
PCT International Search Report, PCT Application No. PCT/US2016/058078, dated Jan. 25, 2017, 3 pages.
Lee et al., "Visual Search and Retrieval Using Semantic Information", U.S. Appl. No. 15/156,466, filed May 16, 2016.
Karpathy et al., "Large-Scale Video Classification with Convolutional Neural Networks." Proceedings of the IEEE Conference on Computer Vision and Pattern Recognition, 2014, 8 pages, USA.

* cited by examiner

200

VIDEO SUMMARIZATION USING SEMANTIC INFORMATION

BACKGROUND ART

Electronic devices typically include image capture mechanisms capable of capturing images, still shots, and video data. Electronic devices include, but are not limited to, mobile and wearable devices. Video data can be easily captured and shared for a variety of purposes. Video data is typically recorded and saved locally or shared online. Due to ease of capture, users can save and share a large number of videos. However, users are unwillingly to spend time and effort in going through the large amount of videos to locate a specific video or moment they want to watch or share. Additionally, the video data can consume a large amount of storage space.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Video summarization is a computer vision system that automatically finds representative and salient moments in a video. It enables users to quickly browse a large collection of videos by seeing highlights and summaries. Also it helps save storage and communication bandwidth by keeping only informative sections. The summary will consist of a set of key frames or sub-scenes that would succinctly convey an overall storyline of the whole video.

Previously many existing video summarization solutions were bounded to using low-level features such as color histogram or optical flow. This content-agnostic approach could not capture semantically meaningful moments when building a summary and worked only for limited cases where professional editing is assumed like movies and TV news. Also their applications were confined to videos of a single event or situation.

Embodiments described herein determines high-level semantic contexts (e.g. activities, objects, locations, and people) residing in a video and produces content-aware summary with an importance scoring mechanism from the semantic contexts. Instead of relying on hand-crafted features, convolutional neural networks are used that extracts data-driven features from millions of images. This deep feature is more invariant to erratic camera motion, illumination change and scene clutter that happen severely in long hour or unedited videos captured by normal users.

Figure 1:
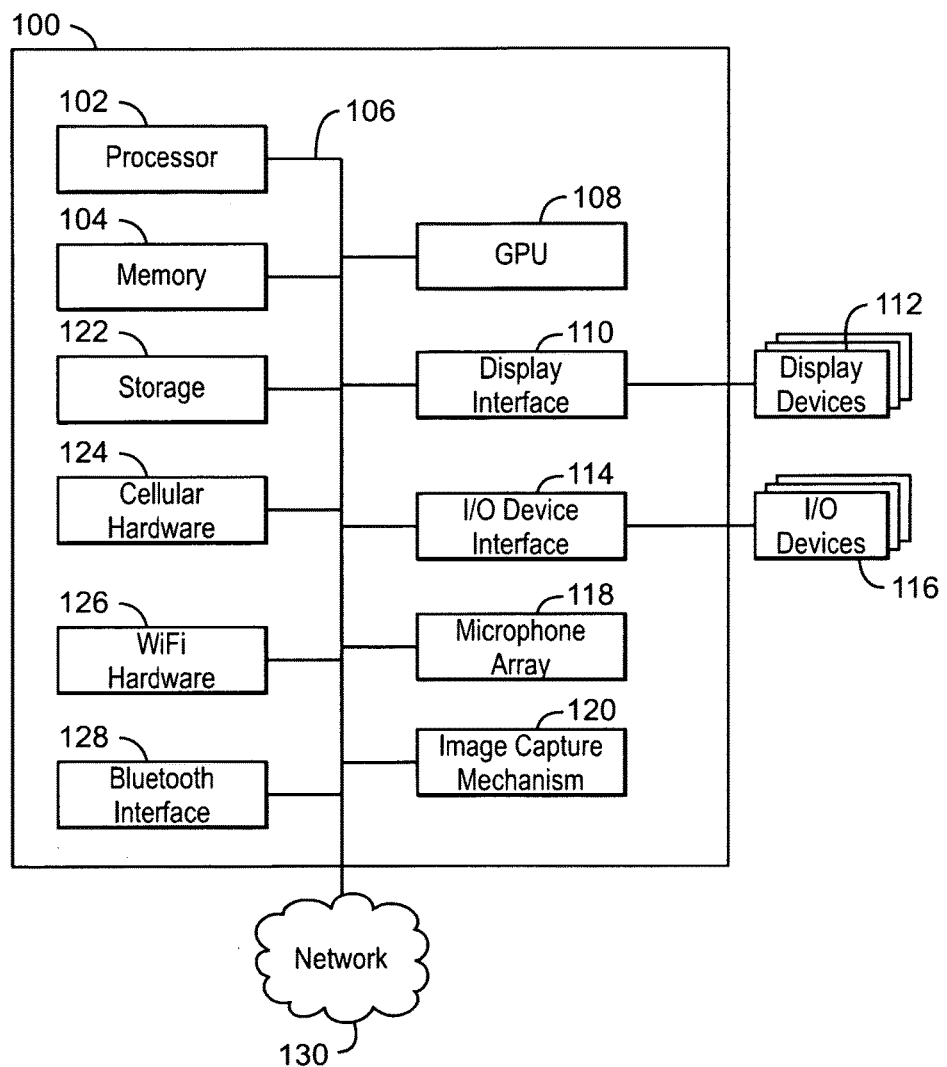
FIG. 1 is a block diagram of an electronic device that enables video summarization using semantic information.

FIG. 1 is a block diagram of an electronic device that enables video summarization using semantic information. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to a display device 122. The display device 122 can include a display screen that is a built-in component of the electronic device 100. The display device 122 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

Accordingly, the electronic device 100 also includes a microphone array 118 for capturing audio. The microphone array 118 can include any number of microphones, including two, three, four, five microphones or more. In some embodiments, the microphone array 118 can be used together with an image capture mechanism 120 to capture synchronized audio/video data, which may be stored to a storage device 122 as audio/video files.

The storage device 122 is a physical memory such as a hard drive, an optical drive, a flash drive, an array of drives, or any combinations thereof. The storage device 122 can store user data, such as audio files, video files, audio/video files, and picture files, among others. The storage device 122 can also store programming code such as device drivers, software applications, operating systems, and the like. The programming code stored to the storage device 122 may be executed by the CPU 102, GPU 108, or any other processors that may be included in the electronic device 100.

High-level contents in a video and their correlation can lead to a more semantically meaningful summary. Video from the GPU or storage 122 can be summarized in a context aware fashion. A context-aware video summary can be generated from unedited videos captured by wearable and mobile devices. High-level semantic entities may be extracted, such as activities, objects and places from a video by using deep network like CNN (Convolutional Neural Network). A scoring mechanism may be implemented that evaluates an importance level of each scene based on the correlation between semantic entities (e.g. co-occurrence between activities and objects).

The CPU 102 may be linked through the bus 106 to cellular hardware 124. The cellular hardware 124 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 126 without being tethered or paired to another device, where the network 130 is a cellular network.

The CPU 102 may also be linked through the bus 106 to WiFi hardware 126. The WiFi hardware is hardware according to WiFi standards (standards promulgated as Institute of Electrical and Electronics Engineers' (IEEE) 802.11 standards). The WiFi hardware 126 enables the wearable electronic device 100 to connect to the Internet using the Transmission Control Protocol and the Internet Protocol (TCP/IP), where the network 130 is the Internet. Accordingly, the wearable electronic device 100 can enable end-to-end connectivity with the Internet by addressing, routing, transmitting, and receiving data according to the TCP/IP protocol without the use of another device. Additionally, a Bluetooth Interface 128 may be coupled to the CPU 102 through the bus 106. The Bluetooth Interface 128 is an interface according to Bluetooth networks (based on the Bluetooth standard promulgated by the Bluetooth Special Interest Group). The Bluetooth Interface 128 enables the wearable electronic device 100 to be paired with other Bluetooth enabled devices through a personal area network (PAN). Accordingly, the network 130 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
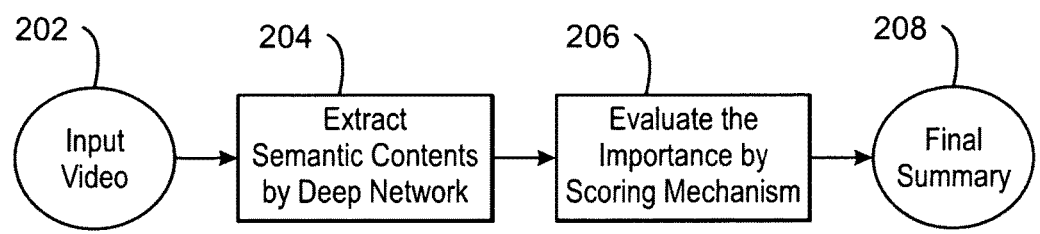
FIG. 2 is an overview of video summarization using semantic information.

FIG. 2 is an overview of video summarization using semantic information. At block 202, an input video is obtained. The input video can be video being currently captured by an image capture mechanism or store or saved videos. Additionally, the input video can be a movie or a television show. At block 204, the content of the input video can be extracted using a deep network. A deep network, as used herein, may be the result of a deep learning architecture that includes algorithms with many layers that can be used for feature extraction and transformation. Deep networks include a convolutional neural network (CNN) that is a feed-forward artificial neural network with individual neurons tiled in a manner that response to overlapping regions in the visual field. For example, a convolutional neural network can consist of multiple layers of small neuron collections which can analyze each frame of the input video. The results of these collections are then tiled so that they overlap to obtain a better representation of the activity or objects present in the video data. This tiling can be repeated for every such layer of the convolutional neural network.

At block 206, the importance of each frame, according to an analysis of the semantic contents of each frame, is evaluated in connection with a scoring mechanism. Semantic contents, as used herein, refers to the meaning associated with contents of each frame. The importance associated with the semantic contents of each frame may be scored differently based on a relationship between the various semantic contents found in each frame. At block 208, a final summary is generated. The final summary can answer the following questions when key frames or key sub-scenes are presented to a user, such as: what series of activities does the original video contain; how many different locations or places the video was taken at; and what objects are important and who appears in the video? The final summary may be based on an importance score of each video clip above a particular threshold. In this manner, the resulting video summary is a context aware video summary through the use of semantic information associated with each video clip.

Typical video summarization solutions are based on low-level features like color or motion cues and they have difficulty in answering these questions about the original video correctly because by nature they are given no clue on what part of videos are semantically representative moments. The present techniques are based on a high-level semantic context and can provide more meaningful answers close to what a user anticipates when watching the whole original video. Furthermore, the correlation between semantic contents enables important aspects across the video to be noted. For example, in a video where "brushing teeth" has been identified as an activity, the resulting summary should consider more frames containing key objects like tooth brushes/pastes as important frames and include them as part of the summary. As used herein, important frames are frames with a high score, as described below. A high score may be high compared to other scores, or it may be a score above a particular threshold.

In the present techniques, the correlation between two semantic contents such as the activity and an object, is leveraged to improve the quality of a video summary. The semantic contents are extracted from the video using deep machine learning techniques like CNN. Deep features trained from millions of images have a more discriminative power and in general show higher classification and detection accuracy than those from previously used hand-crafted features. Adding new semantic information into the summarization would be done more conveniently under the same deep learning architecture.

Additionally, the length and content complexity of an input video according to the present techniques can handle a broader scope of use cases. Existing methods are usually restricted to video inputs containing a short and single event. From the benefit of deep features, which are more insensitive to illumination change, camera motion and scene clutter, a consistent summarization performance is achievable even for long hour videos with multiple events taken by wearable or mobile devices.

Figure 3:
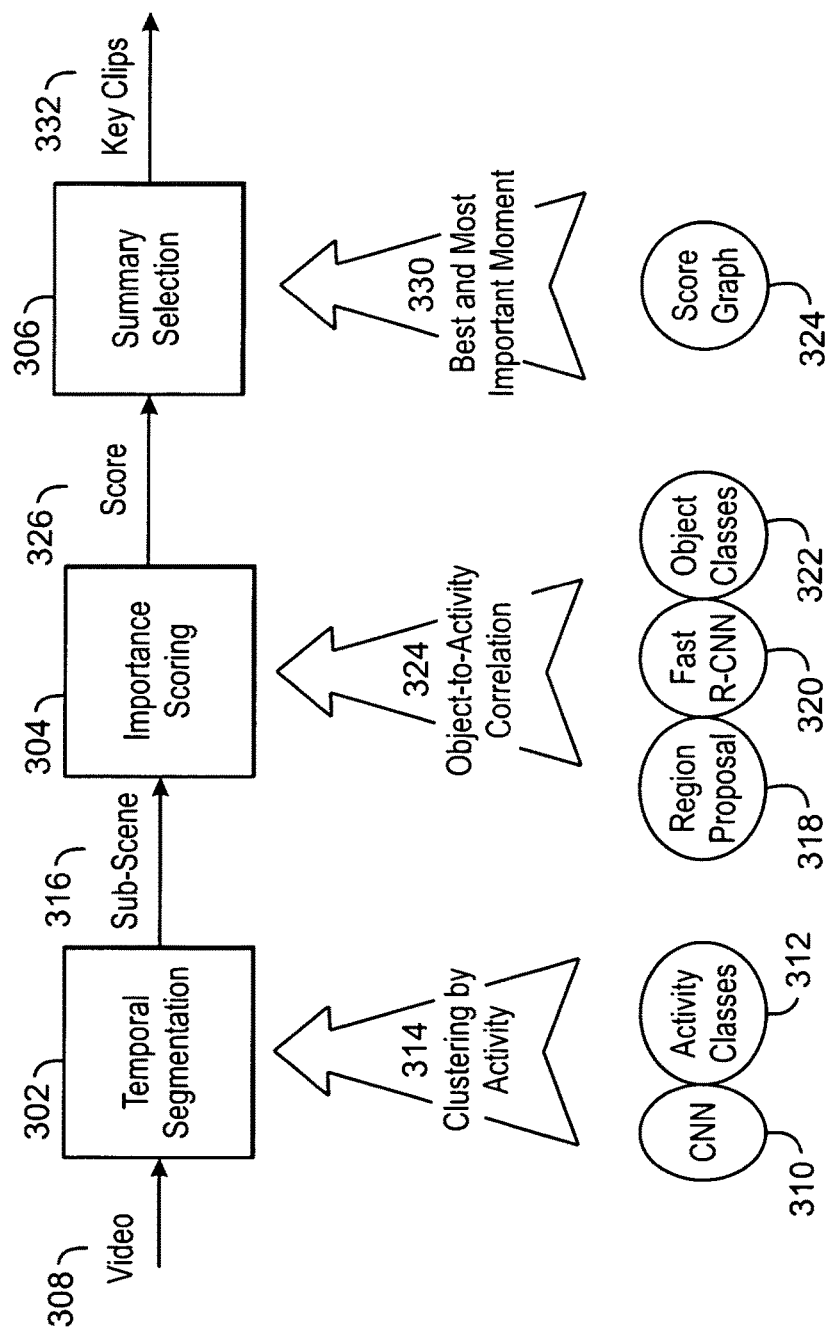
FIG. 3 is an overview of a video summarization pipeline.

FIG. 3 is an overview of a video summarization pipeline 300. The pipeline 300 represents a content-aware video summarization technique that generates a set of key frames or abstracted clips from a given video through the analysis of semantic visual contents. It involves deep machine learning techniques as discussed above that provide activity classification and object detection. Types of input videos are not only movies or TV films which are professionally edited, but also unedited or unstructured ones taken by wearable or mobile devices.

FIG. 3 illustrates three main modules comprising a summarization method: temporal segmentation 302, importance scoring 304, and summary selection 306. The temporal segmentation 302 module detects shot boundaries from activity transition and divides the input video into a set of sub-scenes, where each sub-scene includes one or more activity segments. In embodiments, the shot boundary is an obvious transition between various settings of the video. For example, a shot boundary may be a transition from one room to another in a video. In each activity segment the importance scoring module 304 detects visual objects and evaluates a score for each image frame weighted by an object-to-activity co-occurrence. Finally the summary selection module 306 chooses a high score region that would be the most important and salient moment within that activity segment. A region is a specific area in the image. Then a set of the summarized key clips from every sub-scene are collected and displayed for users.

In particular, temporal segmentation 302 divides an input video 308 into sub-scenes that includes semantically different activities. A convolution neural network (CNN) 310 can be used for activity classification. For example, the CNN may be trained for 20 daily indoor/outdoor activities, such as brushing teeth, watching TV, using computer, eating food, making food, laundry, and etc. To find temporal segments each frame is first classified into one of the activity classes 312 by an activity classifier via the CNN 310. Once all the frames in the input video are classified, activity labels are temporally smoothened using the mode filter in order to prune misclassified labels. Each activity segment consists of continuous frames with the same activity in a minimum time. The segments shorter than a certain threshold are removed and adjacent segments belonging to the same activity are joined. Thus, the segments can be clustered by activity as indicated by arrow 314.

Once the video is divided into activity segments, best moments from each segment are selected according to a scoring function. Thus, the classified sub-scenes 316 are sent to the importance scoring module 304. For a given activity segment A, the following two scoring mechanisms may be applied. An activity based score is calculated as follows:

$$S1 = \text{ProbAct}(f_i, A)$$

where ProbAct( ) is a classification probability returned by the activity classifier. The score S1 and classification probability is a degree of belief that an image frame $f_i$ at the time i belongs to activity class A. The second score is an activity-to-object co-occurrence based score:

$$S2 = \sum_i \text{ProbObj}(O_i)\text{Concurrence}(O_i, A)$$

where ProbObj($O_i$) is a probability returned by the object detector, which means that an object $O_i$ belongs to its labelled class. The Concurrence ($O_i$, A) represents how important is an object is for a particular activity. The score S2 gives a higher score to a frame containing more important objects which are highly correlated with a labelled activity of the segment. The co-occurrence is computed by what fraction of frames of activity A have an object $O_i$ in the frames.

The importance of an object $O_i$ for an activity A is directly proportional to the value of Concurrence ($O_i$, A) as follows:

$$\text{Concurrence}(O_i, A) = \frac{F(O_i, A)}{F(A)}$$

where $F(O_i, A)$ is the number of frames in activity A that contains an object $O_i$ and $F(A)$ is the total number of frames for activity A.

The co-occurrence is learned from the object and activity labels of training data. Labels can be obtained by running both activity classifier and object detector on the training data or by human annotation. For example, Table 1 shows the first two most co-occurring objects with given activities, which is used in our experiment.

TABLE 1

| Activity | Object #1 | Object #2 |
| --- | --- | --- |
| Wash face | Tap | Soap |
| Laundry | Washer/dry | Container |
| Watching TV | TV | Door |
| Reading/writing | Book | Laptop |
| Eating food | Dish | Mug/cup |

Accordingly, a region proposal is made at reference number 318. A CNN is then used to classify the objects in each region of the frame. A fast, regional CNN 320 may be used to learn the objects in each region of the frame. The regional CNN 320 results in object classes 322. The object classes 322 and the activity classes 312 may be used in the equations above, and an object to activity correlation may be found as indicated at arrow 324.

The scores 326 resulting from the equations above and the object to activity correlation as indicated at arrow 324 are sent to the summary selection module 306. The summary selection module 306 generates a final summary of the most important frames or highlights of the video clips 332. The final summary can be generated in various ways by inspecting the importance score distribution or a score graph 328. For example, a set of key image frames, each of which corresponds to the highest score for each activity segment may be selected as indicated by arrow 330. In another example, a set of key clips each of which corresponds to an N-second of each action segment that shows the highest score sum can be selected for the final summary. In embodiments, N can be chosen arbitrarily, such as five or ten second depending on a user's preference or storage constraint.

In embodiments, the activity classifier and object detector used are each CNN-based deep networks. The CNN-based deep networks are pre-trained by millions of images from database for hundreds of different labels, and then fine-tuned for use with video summarization, including a modified set of labels and additional training datasets. A dataset may be, for example, millions of frames of dozens of people performing unscripted, everyday activities.

Consider, for example, a dataset consisting of 20 videos collected by different individuals capturing their everyday activities at their own homes. Along with videos human annotations for activities and object classes are provided for ground truth. In evaluation 15 videos are used for training and the remaining 5 are for testing.

Figure 4:
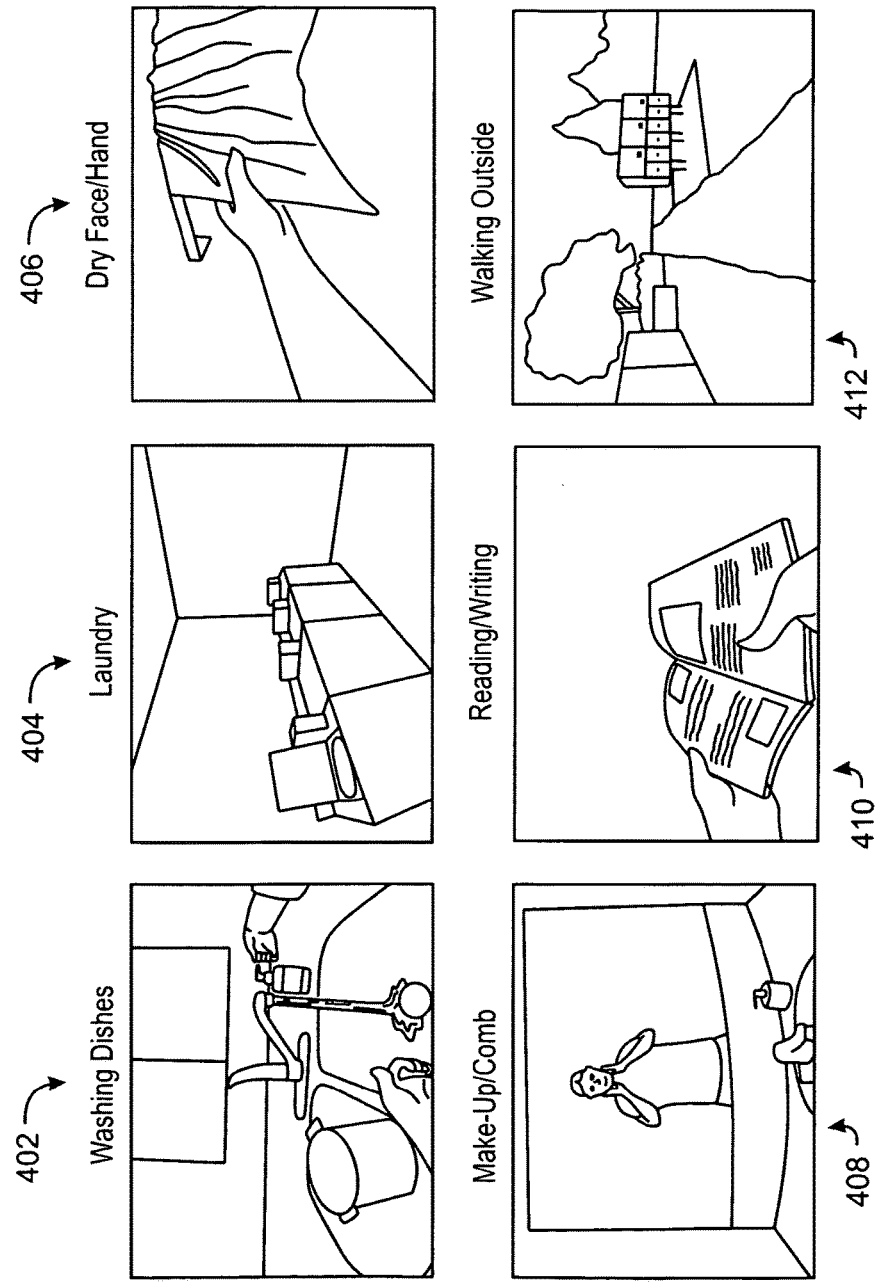
FIG. 4 is an illustration of the qualitative result of the CNN activity classifier.

FIG. 4 is an illustration of the qualitative result 400 of the CNN activity classifier. Six frames are illustrated with the resulting activity class. Although six frames are illustrated, any number of frames may be used. For each frame, the activity classes are washing dishes 402, laundry 404, dry face/hand 406, makeup/comb 408, reading/writing 410, and walking outside 412. Activity classification as described above may be performed using a CNN-based deep network that is trained for classifying 20 activities using the human annotations. The activity classification yields a 55.1% accuracy in frame-by-frame testing. The weights of the network can be initialized by a pre-trained network like MIT Places Hybrid-CNN (which trained by 2.3 million images for 1183 object/scene classes). The weights may be defined as the coefficient numbers of each node in the CNN network.

The temporal segmentation module uses the following 20 activity labels for segmenting the input video by activity shown in FIG. 4: Make-up/comb, Brush teeth, Wash face/hand, Dry face/hand, Laundry, Adjust thermostat, Wash dishes, Make tea/coffee, Drink water-bottle, Make food, Eat food, Mop kitchen, Vacuum, Take pills, Watch N, Use computer, Use cell, Reading/writing, Drink coffee, Walk outside. The accuracy number of 55.1% is good considering that most of these activity classes are very similar to each other. Additionally, twenty activity labels are used in FIG. 4 as an example, and any number of activity labels can be used according to the present techniques.

After the activities have been classified, object detection is performed. As discussed above, a fast-RCNN may be used for object detection. The fast-RCNN may take a CNN pre-trained with an image database organized according to the WordNet hierarchy, in which each node of the hierarchy is depicted by hundreds and thousands of images. The fast-RCNN then fine-tunes the network on a visual object class detection data. The fast-RCNN may be additionally trained for more object classes using the annotation as provided.

Figure 5:
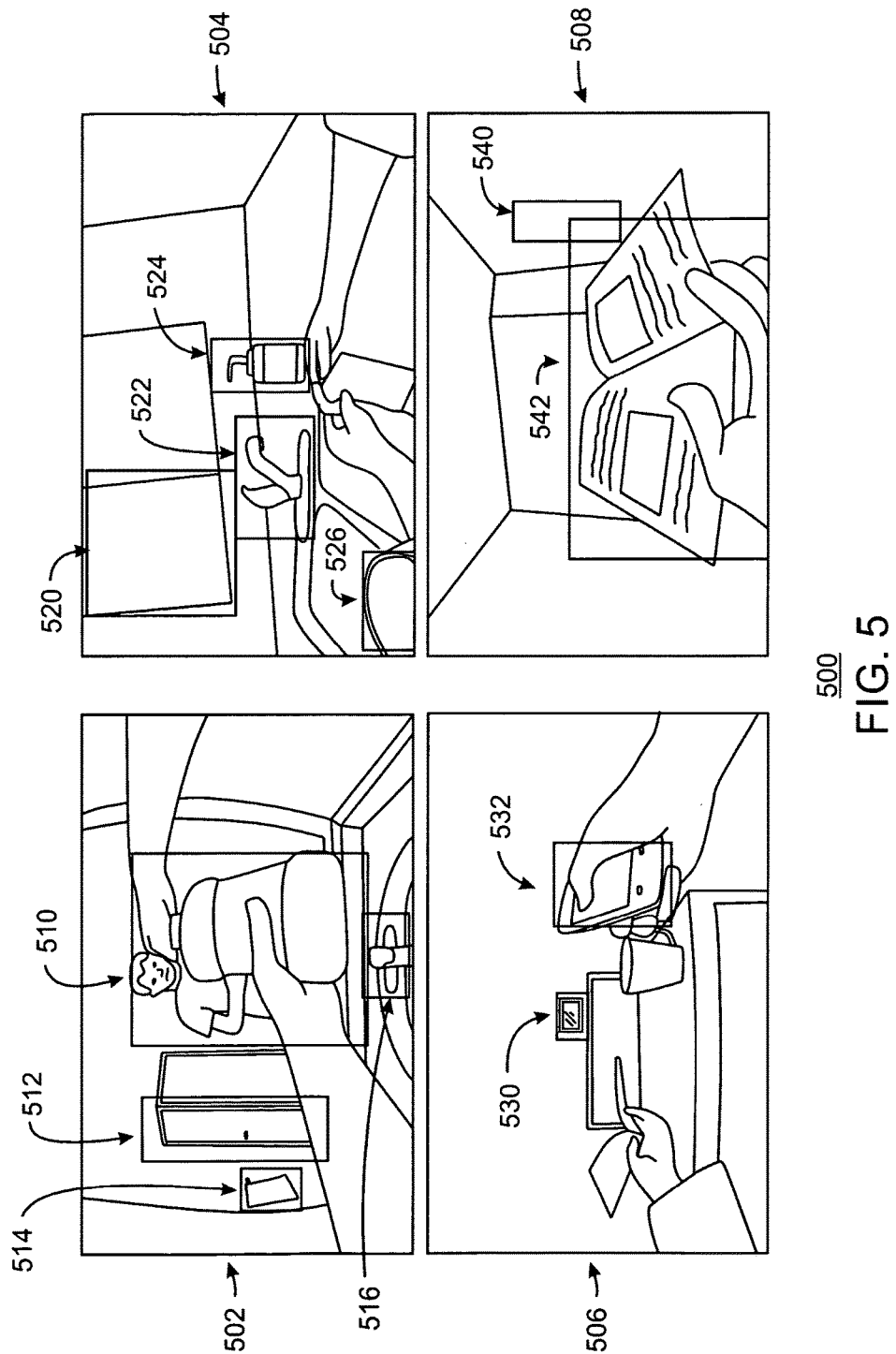
FIG. 5 is an illustration of bounding boxes with detection probability for object classification.

FIG. 5 is an illustration of bounding boxes with detection probability for object classification. FIG. 5 includes frame 502, frame 504, frame 506, and frame 508. Frame 502 includes and a person 510, a door 512, a towel 514, and a tap 516. Frame 504 includes a window 520, a tap 522, soap/liquid 524, and a cup 526. Frame 506 includes a television 530 and a cell phone 532. Frame 508 includes a door 540 and a book 542. Each detected object within the frame includes a bounding boxes with a detection probability in test images by Fast-RCNN.

Figure 6A:
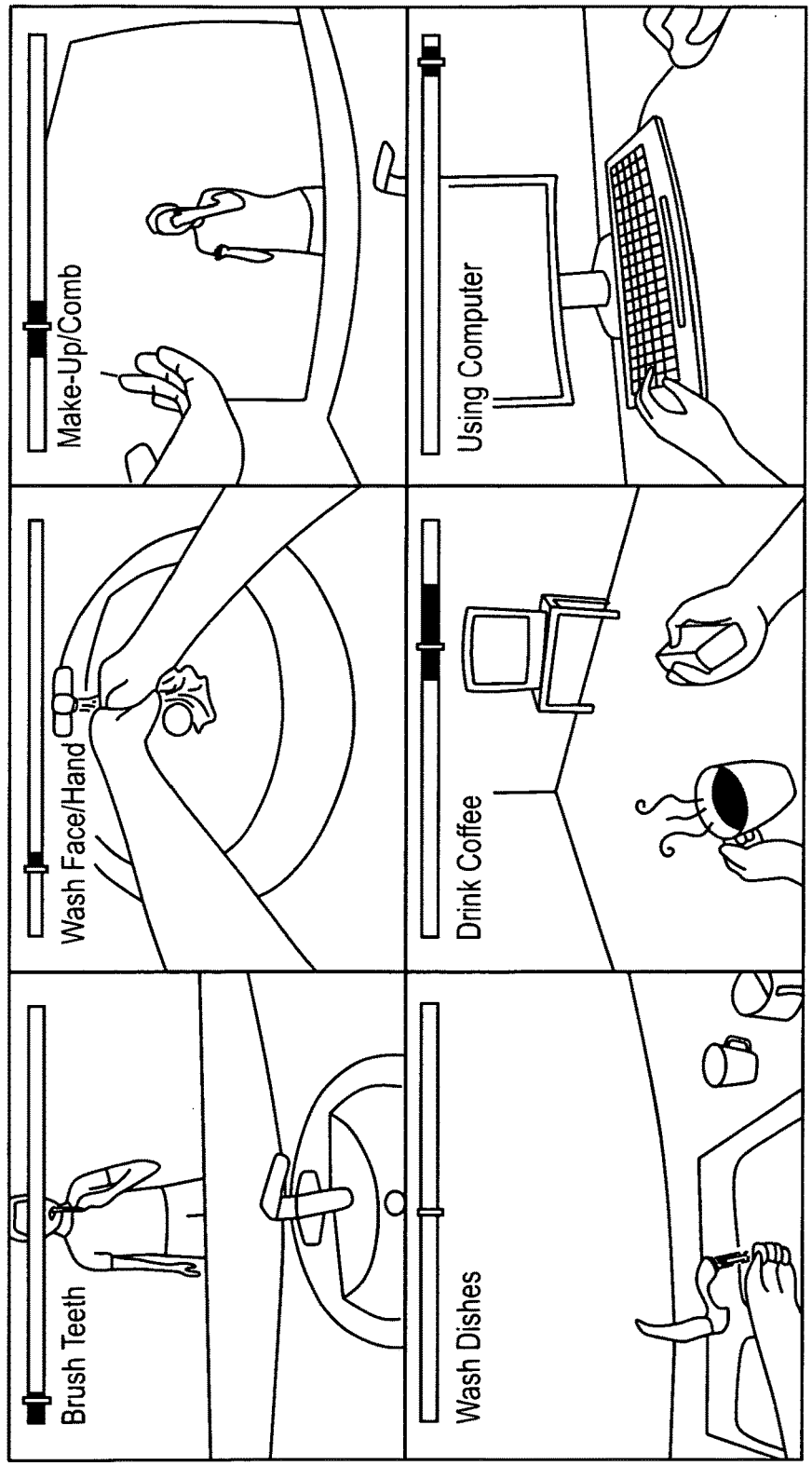
FIGS. 6A and 6B illustrate a video summary.
Figure 6B:
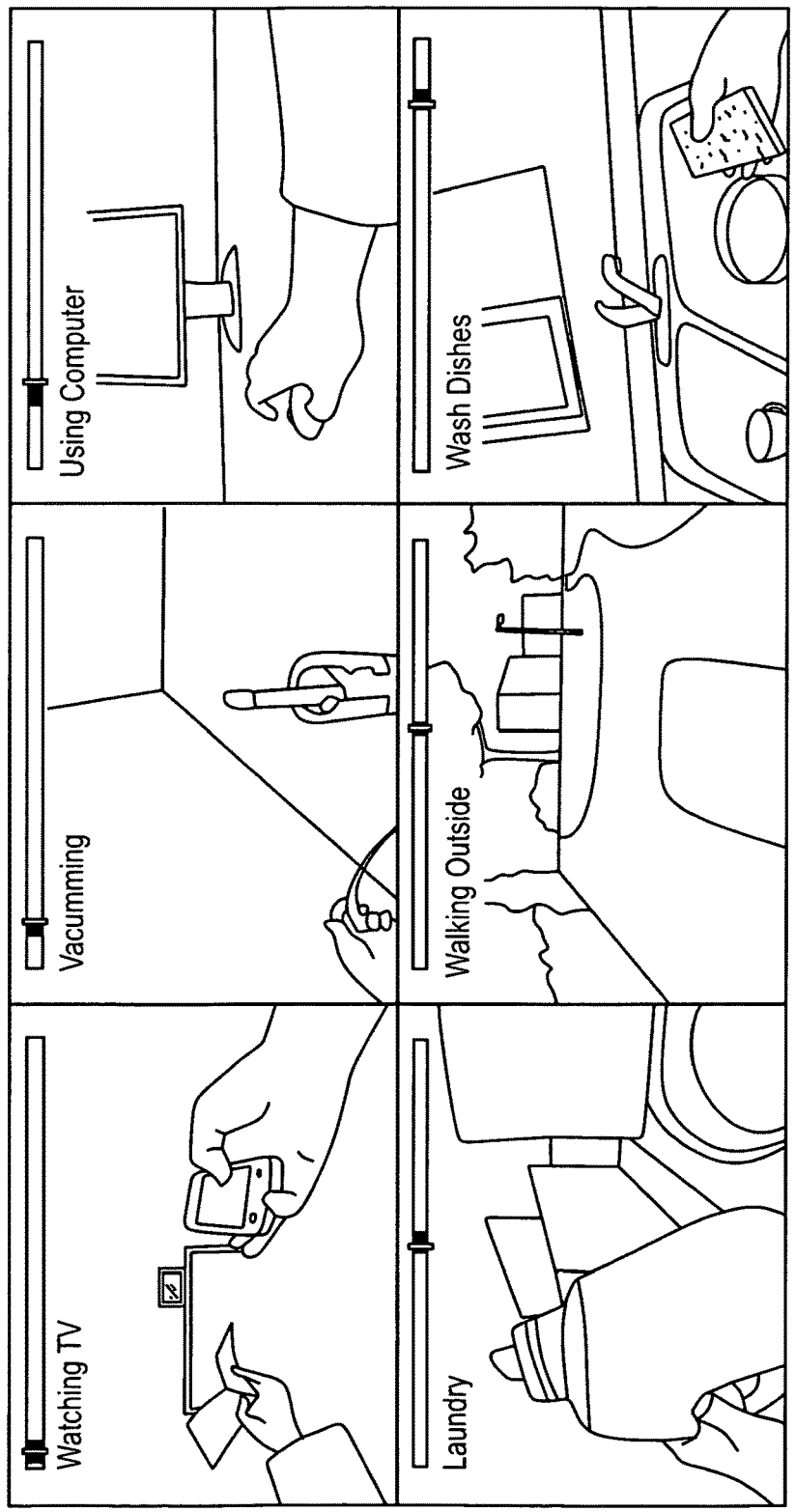

A video summary may be created by selecting the best five continuous seconds based on the S2 score (activity-to-object co-occurrence based scoring) from six activity segments. The same activity is prevented from being repeated in the summary and longer activities are preferably included in the summary. To visualize the summary, best moments of each activity segment is displayed in a grid layout in FIGS. 6A and 6B. In these figures a bar 602 represents an entire duration of the video input and the cross-hatched portion 604 blue bar represents time period of the activity segment. The solid portion 606 indicates the moment of the highest importance score shown in the grid. The location of the solid portion 606 was decided according to the scoring mechanism S2. The summarized outputs show the capability of our algorithm to capture meaningful moments of important activities. When compared with naïve uniform sampling, many important activities in the video are missed. In content-unaware methods like the uniform sampling, one drawback is that certain activities taking a very long duration may dominate the summary.

Figure 7:
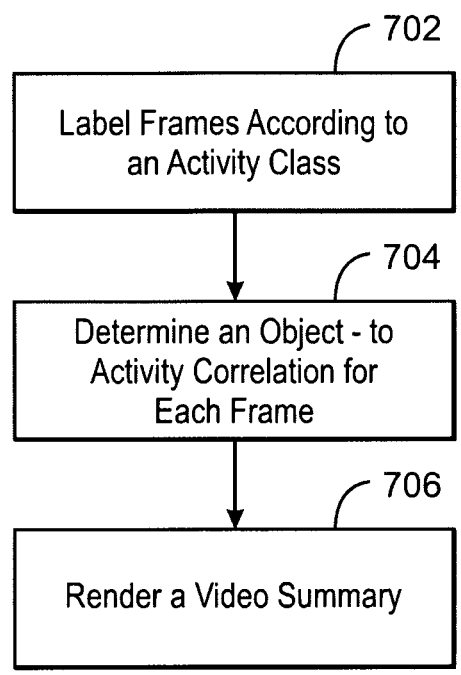
FIG. 7 is a process flow diagram of a method for video summarization with semantic information.

FIG. 7 is a process flow diagram of a method for video summarization with semantic information. At block 702, each frame of a plurality of frames may be labeled according to an activity class. In embodiments, the plurality of frames is segmented into sub-scenes. At block 704, an object-to-activity correlation for each frame is determined. In embodiments, the object-to-activity correlation results in one or more scores that indicate the likelihood that an object is related to the particular activity class for the frame. At block 706, a video summary is rendered. The video includes the frames with the highest object-to-activity correlation for each frame in sub-scene or a shot boundary.

Figure 8:
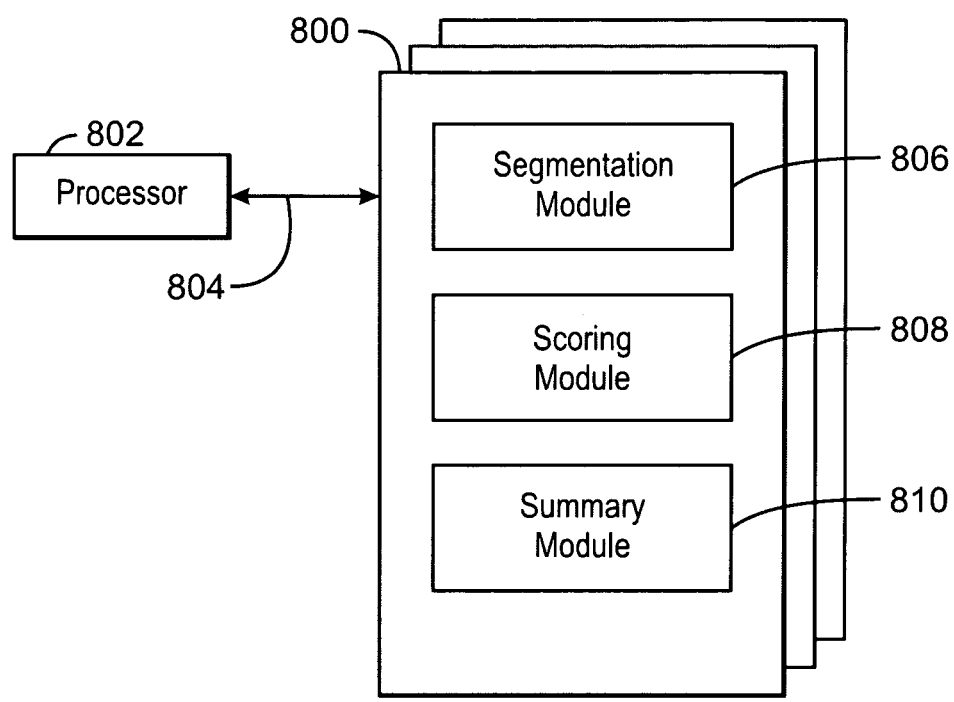
FIG. 8 is a block diagram showing a medium that contains logic for video summarization.

FIG. 8 is a block diagram showing a medium 800 that contains logic for video summarization. The medium 800 may be a computer-readable medium, including a non-transitory medium that stores code that can be accessed by a processor 802 over a computer bus 804. For example, the computer-readable medium 800 can be volatile or non-volatile data storage device. The medium 800 can also be a logic unit, such as an Application Specific Integrated Circuit (ASIC), a Field Programmable Gate Array (FPGA), or an arrangement of logic gates implemented in one or more integrated circuits, for example.

The medium 800 may include modules 808-810 configured to perform the techniques described herein. For example, a segmentation module 806 may be configured segment the frames into video data and apply an activity class to the segments. A scoring module 808 may be configured to generate one or more scores based on an object-to-activity correlation. A summary module 810 may be configured to render frames with the highest object-to-activity correlation in a video summary.

The block diagram of FIG. 8 is not intended to indicate that the medium 800 is to include all of the components shown in FIG. 8. Further, the medium 800 may include any number of additional components not shown in FIG. 8, depending on the details of the specific implementation.

Example 1 is an apparatus. The apparatus includes a controller to segment an incoming video stream into a plurality of activity segments, wherein each frame is associated with an activity; a scoring mechanism to calculate a score for each frame of each activity, wherein the score is based, at least partially, on a classification probability of each frame; and a summarizer to summarize the activity segments based on the score for each frame.

Example 2 includes the apparatus of example 1, including or excluding optional features. In this example, the score is based on, at least partially, an activity-to-object co-occurrence.

Example 3 includes the apparatus of any one of examples 1 to 2, including or excluding optional features. In this example, the activities are segmented by one or more shot boundaries and each frame is labeled according to an activity class.

Example 4 includes the apparatus of any one of examples 1 to 3, including or excluding optional features. In this example, a convolutional neural network is used to classify each segment into an activity. Optionally, frames with mislabeled activities are relabeled according to the activities of surrounding frames.

Example 5 includes the apparatus of any one of examples 1 to 4, including or excluding optional features. In this example, a fast, regional convolutional neural network is used to classify a plurality of objects of each frame.

Example 6 includes the apparatus of any one of examples 1 to 5, including or excluding optional features. In this example, segments lower than a predefined threshold in length are discarded.

Example 7 includes the apparatus of any one of examples 1 to 6, including or excluding optional features. In this example, the scoring mechanism determines a score that is the probability that a frame belongs to an activity based on objects in the frame.

Example 8 includes the apparatus of any one of examples 1 to 7, including or excluding optional features. In this example, the scoring mechanism determines a score that is the probability that an object of a frame belongs to a class of objects combined with the importance of the object for the activity assigned to the frame.

Example 9 includes the apparatus of any one of examples 1 to 8, including or excluding optional features. In this example, the summarizer is to create a summary by adding frames to the summary with scores above a predefined threshold.

Example 10 includes the apparatus of any one of examples 1 to 9, including or excluding optional features. In this example, the summary is generated by selecting key image frames that correspond to the highest score for each segment, or key clips of N-seconds are selected for each segment.

Example 11 is a method for video summarization. The method includes labeling each frame of a plurality of frames according to an activity class; determining an object-to-activity correlation for an object within each frame; and rendering a video summary that comprises the frames with object-to-activity correlations above a predetermined threshold for each frame in a shot boundary.

Example 12 includes the method of example 11, including or excluding optional features. In this example, object to activity correlation is obtained by executing both an activity classifier and object detector on a set of training data, by human annotation, or by any combination thereof.

Example 13 includes the method of examples 11 or 12, including or excluding optional features. In this example, the importance of an object for an activity is directly proportional to the value of the number of frames in activity that contains an object divided by the total number of frames for that activity.

Example 14 includes the method of any one of examples 11 to 13, including or excluding optional features. In this example, a convolutional neural network is used to label each frame according to an activity class.

Example 15 includes the method of any one of examples 11 to 14, including or excluding optional features. In this example, a fast, regional convolutional neural network is used to classify a plurality of objects of each frame.

Example 16 includes the method of any one of examples 11 to 15, including or excluding optional features. In this example, a probability than the object belongs to a particular activity is used to determine, at least partially, the object to activity correlation.

Example 17 includes the method of any one of examples 11 to 16, including or excluding optional features. In this example, a scoring mechanism determines a score that is the probability that a frame belongs to an activity based on objects in the frame that is used to determine, at least partially, the object to activity correlation.

Example 18 includes the method of any one of examples 11 to 17, including or excluding optional features. In this example, a scoring mechanism determines a score that is the probability that an object of a frame belongs to a class of objects combine with the importance of the object for the activity assigned to the frame, that is used to determine, at least partially, the object to activity correlation.

Example 19 includes the method of any one of examples 11 to 18, including or excluding optional features. In this example, the video summary is rendered by creating a summary by adding frames to the summary with an object-to-activity correlation above a predefined threshold.

Example 20 includes the method of any one of examples 11 to 19, including or excluding optional features. In this example, the video summary is generated by selecting key image frames that correspond to the highest an object-to-activity correlation.

Example 21 is a system. The system includes a display; an image capture mechanism; a memory that is to store instructions and that is communicatively coupled to the image capture mechanism and the display; and a processor communicatively coupled to the image capture mechanism, the display, and the memory, wherein when the processor is to execute the instructions, the processor is to: label each frame of a plurality of frames according to an activity class; determine a score corresponding to each frame; and render a video summary that comprises the frames with scores above a predetermined threshold for each frame in a shot boundary.

Example 22 includes the system of example 21, including or excluding optional features. In this example, the score is based on, at least partially, an activity-to-object co-occurrence of an object within each frame.

Example 23 includes the system of any one of examples 21 to 22, including or excluding optional features. In this example, the score is based on, at least partially, a classification probability of each frame.

Example 24 includes the system of any one of examples 21 to 23, including or excluding optional features. In this example, a convolutional neural network is used to label each frame of the plurality of frames according to an activity class.

Example 25 includes the system of any one of examples 21 to 24, including or excluding optional features. In this example, frames with mislabeled activity classes are relabeled according to the activities of surrounding frames.

Example 26 includes the system of any one of examples 21 to 25, including or excluding optional features. In this example, a fast, regional convolutional neural network is used to classify a plurality of objects of each frame.

Example 27 includes the system of any one of examples 21 to 26, including or excluding optional features. In this example, frames with scores lower than the predetermined threshold are discarded.

Example 28 includes the system of any one of examples 21 to 27, including or excluding optional features. In this example, the score is a probability that an object of a frame belongs to a class of objects combined with the importance of the object for the activity assigned to the frame.

Example 29 is a tangible, non-transitory, computer-readable medium. The computer-readable medium includes instructions that direct the processor to label each frame of a plurality of frames according to an activity class; determine an object-to-activity correlation for an object within each frame; and render a video summary that comprises the frames with object-to-activity correlations above a predetermined threshold for each frame in a shot boundary.

Example 30 includes the computer-readable medium of example 29, including or excluding optional features. In this example, object to activity correlation is obtained by executing both an activity classifier and object detector on a set of training data, by human annotation, or by any combination thereof.

Example 31 includes the computer-readable medium of any one of examples 29 to 30, including or excluding optional features. In this example, the importance of an object for an activity is directly proportional to the value of the number of frames in activity that contains an object divided by the total number of frames for that activity.

Example 32 includes the computer-readable medium of any one of examples 29 to 31, including or excluding optional features. In this example, a convolutional neural network is used to label each frame according to an activity class.

Example 33 includes the computer-readable medium of any one of examples 29 to 32, including or excluding optional features. In this example, a fast, regional convolutional neural network is used to classify a plurality of objects of each frame.

Example 34 includes the computer-readable medium of any one of examples 29 to 33, including or excluding optional features. In this example, a probability than the object belongs to a particular activity is used to determine, at least partially, the object to activity correlation.

Example 35 includes the computer-readable medium of any one of examples 29 to 34, including or excluding optional features. In this example, a scoring mechanism determines a score that is the probability that a frame belongs to an activity based on objects in the frame that is used to determine, at least partially, the object to activity correlation.

Example 36 includes the computer-readable medium of any one of examples 29 to 35, including or excluding optional features. In this example, a scoring mechanism determines a score that is the probability that an object of a frame belongs to a class of objects combine with the importance of the object for the activity assigned to the frame, that is used to determine, at least partially, the object to activity correlation.

Example 37 includes the computer-readable medium of any one of examples 29 to 36, including or excluding optional features. In this example, the video summary is rendered by creating a summary by adding frames to the summary with an object-to-activity correlation above a predefined threshold.

Example 38 includes the computer-readable medium of any one of examples 29 to 37, including or excluding optional features. In this example, the video summary is generated by selecting key image frames that correspond to the highest an object-to-activity correlation.

Example 39 is an apparatus. The apparatus includes instructions that direct the processor to a controller to segment an incoming video stream into a plurality of activity segments, wherein each frame is associated with an activity; a means to calculate a score for each frame; and a summarizer to summarize the activity segments based on the score for each frame.

Example 40 includes the apparatus of example 39, including or excluding optional features. In this example, the score is based on, at least partially, an activity-to-object co-occurrence.

Example 41 includes the apparatus of any one of examples 39 to 40, including or excluding optional features. In this example, the score is based on, at least partially, a classification probability of each frame.

Example 42 includes the apparatus of any one of examples 39 to 41, including or excluding optional features. In this example, the activities are segmented by one or more shot boundaries and each frame is labeled according to an activity class.

Example 43 includes the apparatus of any one of examples 39 to 42, including or excluding optional features. In this example, a convolutional neural network is used to classify each segment into an activity. Optionally, frames with mislabeled activities are relabeled according to the activities of surrounding frames.

Example 44 includes the apparatus of any one of examples 39 to 43, including or excluding optional features. In this example, a fast, regional convolutional neural network is used to classify a plurality of objects of each frame.

Example 45 includes the apparatus of any one of examples 39 to 44, including or excluding optional features. In this example, segments lower than a predefined threshold in length are discarded.

Example 46 includes the apparatus of any one of examples 39 to 45, including or excluding optional features. In this example, the means to calculate a score for each frame determines a score that is the probability that a frame belongs to an activity based on objects in the frame.

Example 47 includes the apparatus of any one of examples 39 to 46, including or excluding optional features. In this example, the means to calculate a score for each frame determines a score that is the probability that an object of a frame belongs to a class of objects combined with the importance of the object for the activity assigned to the frame.

Example 48 includes the apparatus of any one of examples 39 to 47, including or excluding optional features. In this example, the summarizer is to create a summary by adding frames to the summary with scores above a predefined threshold.

Example 49 includes the apparatus of any one of examples 39 to 48, including or excluding optional features. In this example, the summary is generated by selecting key image frames that correspond to the highest score for each segment, or key clips of N-seconds are selected for each segment.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment,"

"one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
   a processor to segment an incoming video stream into a plurality of activity segments, wherein each frame is associated with an activity;
   the processor to execute a scoring mechanism to calculate a score for each frame of each activity, wherein the score is based, at least partially, on a classification probability of each frame and a co-occurrence of a plurality of objects with each activity; and
   the processor to execute a summarizer to summarize the activity segments based on the score for each frame and select a high score region of a frame of the summarized activity segment, wherein the high score region represents a most important and salient moment within the summarized activity segment.

2. The apparatus of claim 1, wherein the activities are segmented by one or more shot boundaries and each frame is labeled according to an activity class.

3. The apparatus of claim 1, wherein a convolutional neural network is used to classify each segment into an activity.

4. The apparatus of claim 3, wherein frames with mislabeled activities are relabeled according to the activities of surrounding frames.

5. The apparatus of claim 1, wherein segments lower than a predefined threshold in length are discarded.

6. The apparatus of claim 1, wherein the scoring mechanism determines a score that is the probability that a frame belongs to an activity based on objects in the frame.

7. The apparatus of claim 1, wherein the scoring mechanism determines a score that is the probability that an object of a frame belongs to a class of objects combined with an importance of the object for the activity assigned to the frame.

8. The apparatus of claim 1, wherein the summarizer is to create a summary by adding frames to the summary with scores above a predefined threshold.

9. The apparatus of claim 1, wherein the summary is generated by selecting key image frames that correspond to the highest score for each segment, or key clips of N-seconds are selected for each segment.

10. A method for video summarization, comprising:
    labeling each frame of a plurality of frames according to an activity class;
    determining an object-to-activity correlation for an object within each frame, wherein the object-to-activity correlation is based, at least partially, on a classification probability of each frame and a co-occurrence of a plurality of objects with each activity, wherein an object is extracted from a frame via frame analysis using a convolutional neural network with tiled neurons; and
    rendering a video summary that comprises the frames with object-to-activity correlations above a predetermined threshold for each frame in a shot boundary.

11. The method of claim 10, wherein object to activity correlation is obtained by executing both an activity classifier and object detector on a set of training data, by human annotation, or by any combination thereof.

12. The method of claim 10, wherein an importance of an object for an activity is directly proportional to a value of the number of frames in an activity that contains the object divided by the total number of frames for that activity and is used to determine the object to activity correlation.

13. The method of claim 10, wherein a convolutional neural network is used to label each frame according to an activity class.

14. The method of claim 10, wherein a fast, regional convolutional neural network is used to classify a plurality of objects of each frame.

15. The method of claim 10, wherein a probability that the object belongs to a particular activity is used to determine, at least partially, the object to activity correlation.

16. A system, comprising:
    a display;
    an image capture mechanism;
    a memory that is to store instructions and that is communicatively coupled to the image capture mechanism and the display; and a processor communicatively coupled to the image capture mechanism, the display, and the memory, wherein when the processor is to execute the instructions, the processor is to:
- label each frame of a plurality of frames according to an activity class;
- determine a score corresponding to each frame wherein the score is based, at least partially, on a classification probability of each frame and a co-occurrence of a plurality of objects with each activity wherein an object is extracted from a frame via frame analysis using a convolutional neural network with tiled neurons; and
- render a video summary that comprises the frames with scores above a predetermined threshold for each frame in a shot boundary.

17. The system of claim 16, wherein the score is based on, at least partially, an activity-to-object co-occurrence of an object within each frame.

18. The system of claim 16, wherein a convolutional neural network is used to label each frame of the plurality of frames according to an activity class.

19. The system of claim 16, wherein frames with mislabeled activity classes are relabeled according to the activities of surrounding frames.

20. A tangible, non-transitory, computer-readable medium comprising instructions that, when executed by a processor, direct the processor to:
- label each frame of a plurality of frames according to an activity class;
- determine an object-to-activity correlation for an object within each frame, wherein the object-to-activity correlation is based, at least partially, on a classification probability of each frame and a co-occurrence of a plurality of objects with each activity, wherein an object is extracted from a frame via frame analysis using a convolutional neural network with tiled neurons; and
- render a video summary that comprises the frames with object-to-activity correlations above a predetermined threshold for each frame in a shot boundary.

21. The computer readable medium of claim 20, wherein object to activity correlation is obtained by executing both an activity classifier and object detector on a set of training data, by human annotation, or by any combination thereof.

22. The computer readable medium of claim 20, wherein an importance of an object for an activity is directly proportional to a value of the number of frames in an activity that contains the object divided by the total number of frames for that activity and is used to determine the object to activity correlation.

* * * * *